(12) United States Patent
Haruki

(10) Patent No.: US 6,603,509 B1
(45) Date of Patent: Aug. 5, 2003

(54) DIGITAL CAMERA CONTROLLABLE BY A PROGRAM

(75) Inventor: Toshinobu Haruki, Kyotanabe (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/093,177

(22) Filed: Jun. 8, 1998

(30) Foreign Application Priority Data

Jun. 10, 1997 (JP) .............................................. 9-152520

(51) Int. Cl.$^7$ ................................................ H04N 5/76
(52) U.S. Cl. .................................. 348/231.1; 348/231.3
(58) Field of Search ................................ 348/220, 231, 348/232, 233, 552, 231.99, 231.1, 231.3, 231.7, 220.1; 386/117, 120, 121; H04N 5/225

(56) References Cited

U.S. PATENT DOCUMENTS

| | | | | |
|---|---|---|---|---|
| 5,016,107 A | * | 5/1991 | Sasson et al. | |
| 5,477,264 A | * | 12/1995 | Sarbadhikari et al. | 348/231 |
| 5,515,101 A | * | 5/1996 | Yoshida | 348/239 |
| 5,563,655 A | * | 10/1996 | Lathrop | 348/231 |
| 5,634,144 A | * | 5/1997 | Mauro et al. | |
| 5,754,227 A | * | 5/1998 | Fukuoka | |
| 6,115,799 A | * | 9/2000 | Ogawa | 711/171 |

FOREIGN PATENT DOCUMENTS

| | | | |
|---|---|---|---|
| EP | 0 675 648 A2 | * | 10/1995 |
| GB | 2 248 707 | * | 4/1992 |
| GB | 2 291 991 | * | 2/1996 |
| JP | 10083342 | * | 3/1998 |

* cited by examiner

Primary Examiner—Tuan Ho
(74) Attorney, Agent, or Firm—Armstrong, Westerman & Hattori, LLP

(57) ABSTRACT

A digital camera includes a CPU. When a memory card recorded with an additional program is mounted, the CPU detects a size of the additional program, a maximum vacant area formed in a flash memory and a size thereof. The CPU then compares the size of the additional program with the size of the maximum vacant area. If the maximum area is sufficiently large, it is written by the additional program. On the other hand, if the size of the maximum vacant area is not greater than the size of the additional program, the photographed image data recorded following the maximum vacant area is moved, for each cluster, to another vacant area, thereby extending the maximum vacant area.

4 Claims, 3 Drawing Sheets

DIGITAL CAMERA CONTROLLABLE BY A PROGRAM

BACKGROUND OF THE INVENTION

1. Field of the Invention

This invention relates to digital cameras, and more particularly to a digital camera, for example, controllable by a program and having an internal memory for recording photographed image data.

2. Description of the Prior Art

In a conventional digital camera of this kind, both of an overall-operation control program and photographed image data are recorded into a common internal memory. Where an additional program is to be fetched from an outside, the additional program is also recorded into the same internal memory.

However, if the recording and erasing photographed image data are repeatedly made, vacant areas are sporadically formed over the internal memory. Due to this, if one continuous vacant area has a size not reaching that of an additional program, the photographed image data has to be erased despite the total size of the vacant areas are greater than the size of the additional program. That is, the program is executed responsive to a count value of a program counter that is incremented by a predetermined clock. Accordingly, if the program is recorded in a scattered form on the internal memory, the program is impossible to execute. Thus, there has been a necessity of a continuous sufficient vacant area.

SUMMARY OF THE INVENTION

Therefore, it is the primary object of this invention to provide a digital still camera which is capable of appropriately fetching an additional program into an internal memory by a simple operation.

This invention is a digital camera controllable by a program and having an internal memory for recording photographed image data, comprising: an inputting means for receiving an additional program; a first detecting means for detecting a first size of the additional program; a first detecting means for detecting a second size of a maximum vacant area formed in the internal memory; a comparing means for comparing the first size with the second size; an extending means for extending the maximum vacant area depending upon a first result of comparison by the first comparing means; and a writing means for writing the additional program to the maximum vacant area.

When an additional program is inputted, the first detecting means detects a first size of the additional program, and the second detecting means detects a second size of a maximum vacant area formed in the internal memory. The first size and the second size are compared by the first comparing means so that the extending means extends the maximum vacant area depending on the comparing result. Then, the writing means writes the additional program to the maximum vacant area.

In one aspect of this invention, the extending means detects another vacant area formed in the internal memory when the first size is greater than the second size to move part of the photographed image data to the other vacant area. Since the photographed image data is recorded over a plurality of clusters, the photographed image data is moved for each cluster. The photographed image data to be moved is predetermined clusters of the photographed image data following the maximum vacant area.

In another aspect of this invention, a fourth detecting means detects a total size of the vacant area formed in the internal memory. The detected total size is compared with the first size so that a predetermined warning is generated depending upon the comparing result. That is, a generating means generates a predetermined warning when the total size is smaller than the first size.

According to this invention, if a first size of a maximum vacant area is smaller than a second size of an additional program, the extending means moves photographed image data to thereby extend the maximum vacant area. It is therefore possible to appropriately fetch an additional program into an internal memory without requiring troublesome operations.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENT

Figure 1:
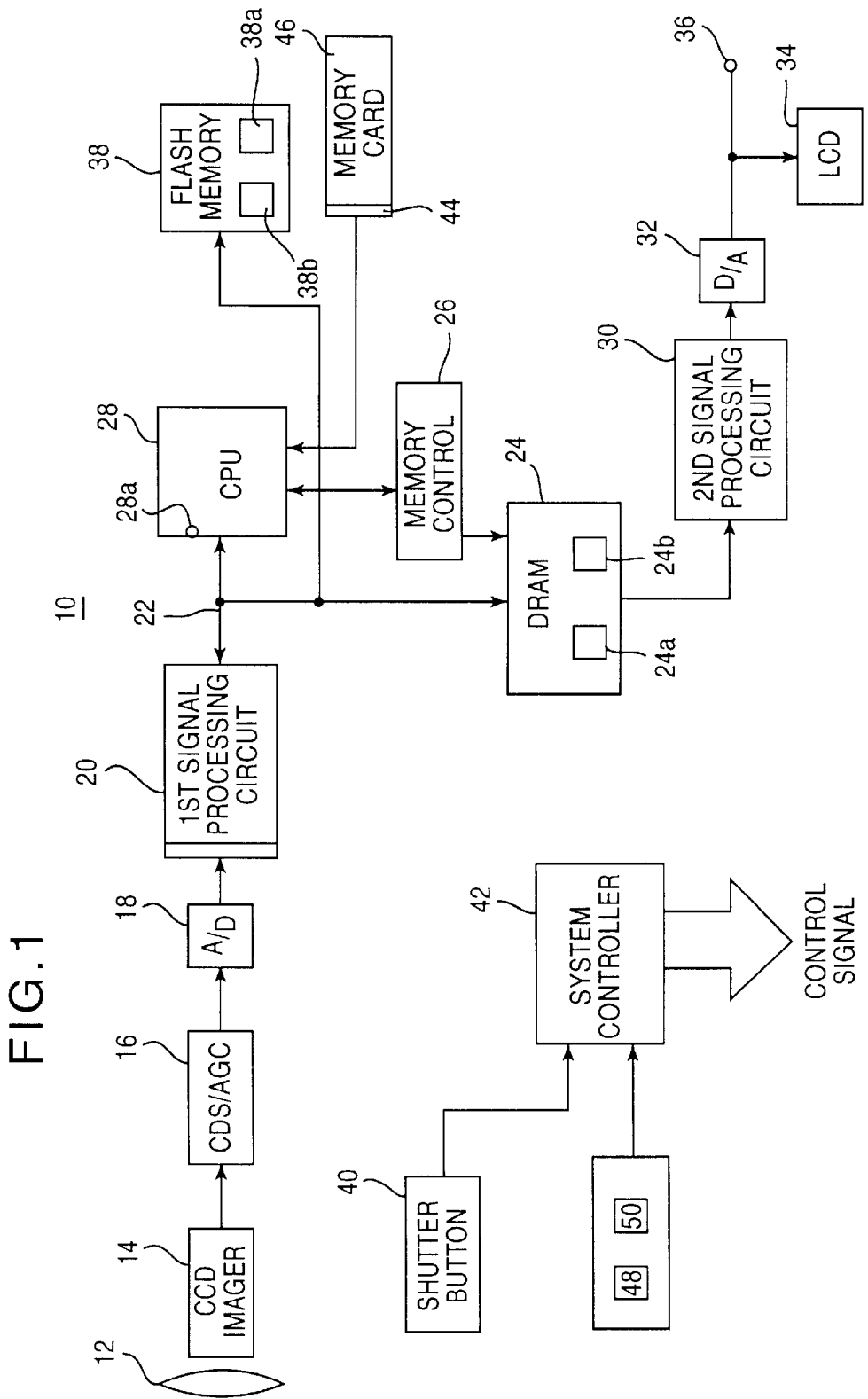
FIG. 1 is a block diagram showing one embodiment of this invention.

Referring to FIG. 1, a digital camera 10 of this embodiment includes a lens 12. An optical image incident upon this lens 12 is given to a CCD imager 14 through a color filter having $C_y$, $Y_e$, $M_g$ and G arranged in the mosaic form. When outputting a motion picture on a monitor 34, the CCD imager 14 performs so-called pixel-mixing readout to simultaneously output continuous two lines of pixel signals from an odd line. The 2-line pixel signals are delivered to a CDS/AGC circuit 16. The CDS/AGC circuit 16 performs well-known noise removal and level adjustment on the inputted pixel signal. The pixel signal processed by this CDS/AGC circuit 16 is converted by A/D converter 18 into 8-bit digital data, i.e. pixel data. A first signal processing circuit 20 performs color separation on the pixel data outputted by the A/D converter 18. The R, G and B data obtained through the color separation are converted into Y, U and V data.

The Y, U and V data thus created are written by a memory control circuit 26 into a memory area 24a of a DRAM 24 through an internal bus 22, and thereafter outputted to a second signal processing circuit 30. The second signal processing circuit 30, during outputting a motion picture, performs predetermined horizontal and vertical interpolations on the Y, U and V data from the DRAM 24 so that they are suited for a display screen size of an LCD 34. The motion image data from the second signal processing circuit 30 is converted by a D/A converter 32 into an analog signal, and supplied to the LCD 34 and outputted through an output terminal 36. As a result, a motion image is displayed on the LCD 34.

If a shutter button 40 is depressed by an operator, a system controller 42 supplies a control signal to the CPU 28 through an interrupt terminal 28a. Accordingly, CPU 28 controls the CCD imager 14 so as to carry out all-pixel readout. This causes the CCD imager 14 to output a pixel signal every line.

The CCD imager 14 is mounted with a color filter in a mosaic form so that Cy and Ye are alternately outputted at an odd line while Mg and G are alternately outputted at an even line. The CDS/AGC circuit 16 performs noise removal and level adjustment on the pixel signal, similarly to the above. The A/D converter 18 converts the pixel signal from the CDS/AGC circuit 16 into digital data, i.e. pixel data. After a 1-frame pixel signal is outputted, the CCD imager 14 is disabled. The 1-frame pixel data created by the A/D converter 18 is directly supplied onto a bus 22, without being processed by the first signal processing circuit 20, and written into the memory area 24a by the memory control circuit 26.

The CPU 28 makes YUV-conversion on the pixel data of the memory area 24a using a working area 24b, compresses the converted Y, U and V data, i.e. photographed image data, according to a JPEG format, and records the compressed data into a flash memory 38. The memory control circuit 26 also reads $C_y$, $Y_e$, $M_g$ and G pixel data line by line from the memory area 24a, and supplies them to the second signal processing circuit 30. The second signal processing circuit 30, when to output a photographed image, performs color separation and YUV conversion on the pixel data to thereby output a photographed image (freeze image) on the LCD 34.

When a reproduce button 48 is depressed by the operator, the CPU 28 reads desired compressed data from the flash memory 38, and extends the compressed data by using the working area 24b. The extended image data (YUV data) is stored into the memory area 24a, and read out later. The second signal processing circuit 30 performs the horizontal interpolation and the vertical interpolation on the image data when outputting a reproduced image. As a result, a desired reproduced image is displayed on the LCD 34.

A control program for controlling the operation of the digital camera 10 is previously recorded in the flash memory 38. The CPU 28 carries out processing in each mode, according to this control program. As understood from FIG. 2, the flash memory 38 has a data area 38 divided into a plurality of clusters so that the control program is recorded continuously from a head address of the data region. That is, the control program is executed according to a count value of a program counter that is incremented by a predetermined clock, and accordingly recorded collectively at one site without being broken up. On the other hand, photographed image data is recorded following the control program. If the recording and erasing of photographed image data are repeated, vacant areas (vacant clusters) are sporadically formed on the data region 38a, for example, as shown by hatched lines in FIG. 2(A), due to a difference in size between respective photographed image data.

Figure 2:
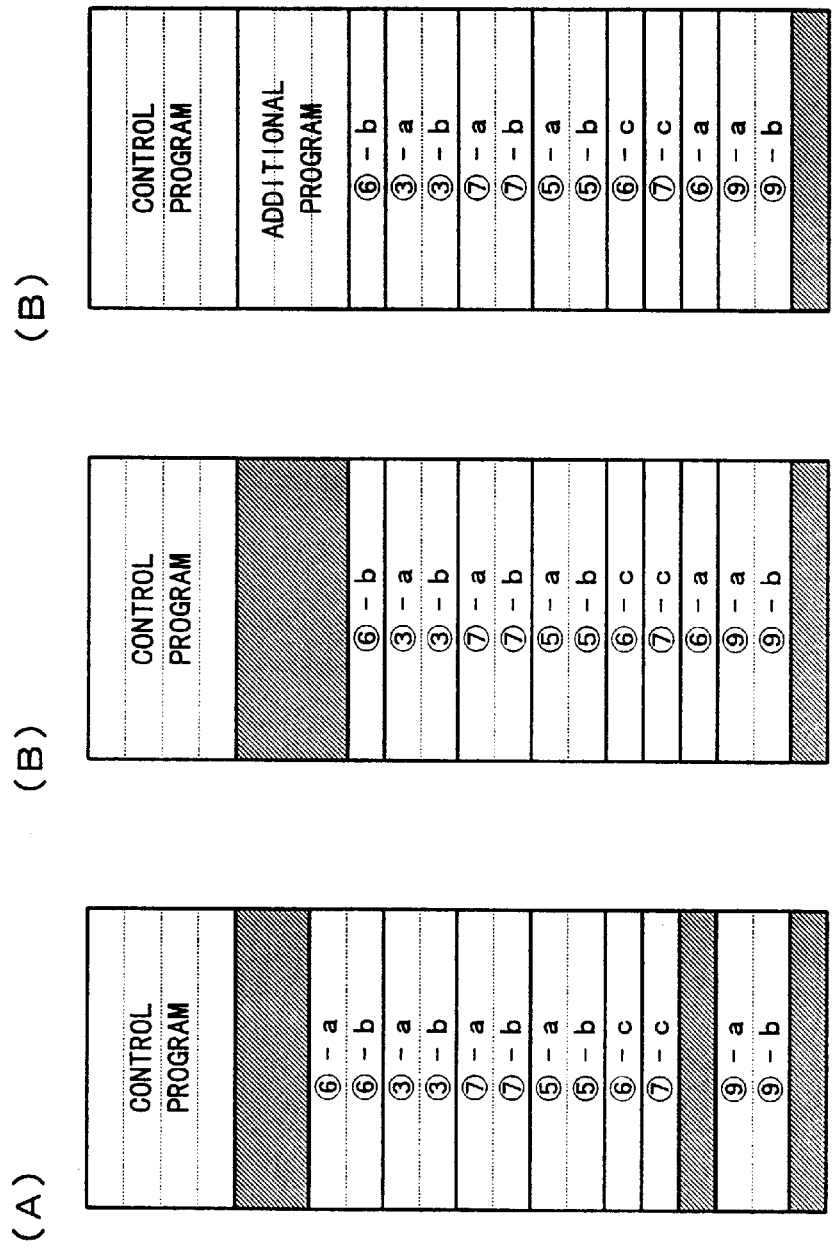
FIG. 2 is an illustrative view showing part of operation in the FIG. 1 embodiment.

In this state, if a memory card 46 recorded with an additional program is attached to a slot 44 and a program registration button 50 is depressed by the operator, the CPU 28 reads an additional program from the memory card 46 to record it into a data region of the flash memory 38. At this time, if the maximum vacant area of the data region 38a is not greater in size than the size of the additional program, the CPU 28 transfers 1 cluster of photographed image data subsequent to the maximum vacant area to another vacant area. In an example of FIG. 2, if the photographed image data subsequent to the maximum vacant area is ⑥-a, this data ⑥-a is transferred to a vacant area next to the data ⑦-c. Due to this, the maximum vacant area is extended as shown in FIG. 2(B), to which the additional program is recorded as shown in FIG. 2(C). Incidentally, if the writing of the additional program requires a capacity of 4 clusters, the data ⑥-b is transferred to an area (vacant cluster) following the data ⑨-b.

Figure 3:
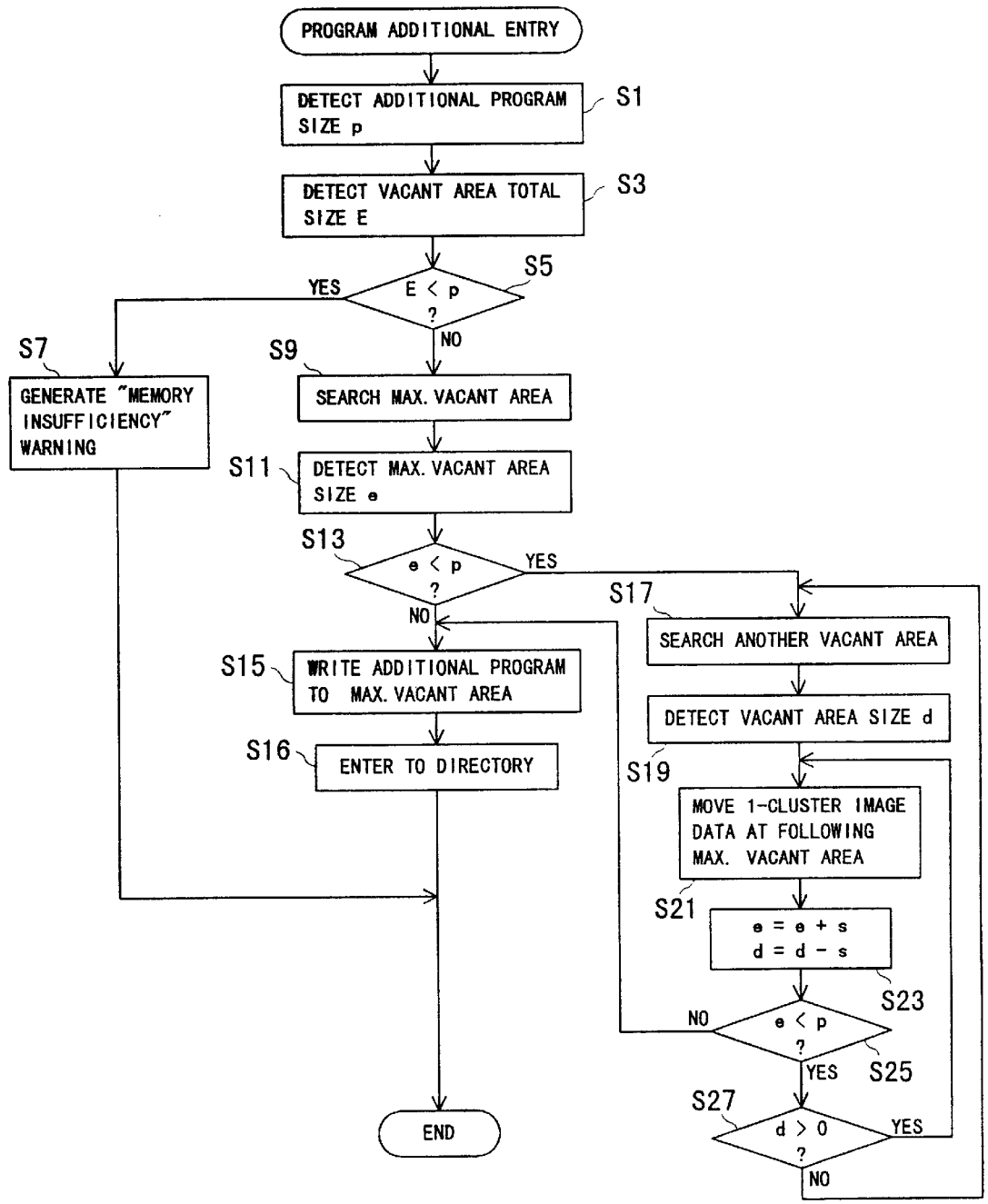
FIG. 3 is a flowchart showing part of operation in the FIG. 1 embodiment.

When an addition registering button 50 is depressed, the CPU 28 processes a flowchart contained in the control program, as shown in FIG. 3. That is, the CPU 28 first detects, at a step S1, a size p of the additional program. Specifically, a directory recorded in the memory card 46 is referred to detect a size p of the additional program. The CPU 28 then refers to a directory 38b of the flash memory at a step S3, and detects a total size E of vacant areas formed in the data region 38a. At a step S5, the size E and the size p are compared with. If the total size E of the vacant areas are not greater than the size p of the additional program, the CPU 28 at a step S7 outputs a warning message "Memory capacity is insufficient" through an LCD 34, thus ending the process.

On the other hand, if the total size E of the vacant areas is greater than the size p of the additional program, the CPU 28 searches, at a step S9, a maximum vacant area formed in the data region 38a, and detects a size E of the maximum vacant area at a step S11. In an example of FIG. 2(E), the 2-cluster vacant area following the control program is searched as a maximum vacant area. The CPU 28 subsequently compares, at a step S13, the size E of the maximum vacant area with the size p of the additional program. If the size E is greater than the size p, the CPU 28 writes the additional program to the maximum vacant area at a step S15, and enters the additional program to the directry 38b at a step S16, thus ending the process.

If it is determined at a step S13 that the size e of the maximum vacant area is smaller than the size p of the additional program, the CPU 28 searches, at a step S17, another vacant area, and detects a size d of a searched vacant area at a step S19. In this example, the vacant area following the image data ⑦-c in FIG. 2(A) is detected at the step S17. The CPU 28, at a step S21, moves a 1-cluster photographed image data following the maximum vacant area to the vacant area that has been detected at the step S17, and updates the sizes e and d at a step S23. In this example, the image data ⑥-a is transferred to a vacant area following the image data ⑦-c as shown in FIG. 2(B). Accordingly, the maximum vacant area is extended by one cluster, and the vacant area detected at the step S17 disappears.

The CPU 28 then compares, at a step S25, the size e of the maximum vacant area with the size p of the additional program, similarly to the step S13. If e≧p stands, the process moves to the step S15, while if e<p, it is determined at a step S27 whether the size p>0 or not. If "YES", the CPU 28 returns the process to the step S21 to move the 1-cluster image data to the remaining portion of the vacant area detected at the step S17. However, if "NO", the process returned to the step S17 to search another vacant area again. In this example, if a vacant area with 3 clusters is formed, the additional program can be written therein. Accordingly, after transferring the image data ⑥-a to another vacant area, the writing of the additional program is effected.

According to this embodiment, if there is no sufficient vacant area for recording an additional program, a continued vacant area is extended by moving image data for each cluster. It is accordingly possible to fetch an additional program into a flash memory 38 without requiring troublesome operations such as erasure of image data or downloading onto a personal computer.

Incidentally, although in this embodiment explanation was made on the case that an additional program held in a memory card is recorded into a flash memory, the additional program may be fetched from a personal computer through an RS232C. In this case, the flowchart shown in FIG. 3 is started by a command from the personal computer. Also, where an additional program is fetched from a personal computer, the additional program is temporarily held within a DRAM 24 in order to detect a size.

Also, an additional program may be a printer driver for coping with a new-product printer or a control software for a modem to be connected through an RS232C.

Further, in this embodiment, the control program, the additional program and the image data are all recorded in the common internal memory. However, it is of course possible to record an original control program in an exclusive internal memory and image data and an additional program to another internal memory.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera controllable by a program and having an internal memory for recording photographed image data, comprising:

a receiver for detecting a first size of the additional program;

a first detector for detecting a first size of the additional program;

a second detector for detecting a second size of a maximum vacant area formed in said internal memory;

a comparer for comparing the first size with the second size;

an extender for extending the maximum vacant area depending upon a result of comparison by said comparer; and a writer for writing the additional program to the maximum vacant area, wherein said extender includes a third detector for detecting another vacant area formed in said internal memory when the first size is greater than the second size, and a mover for moving part of the photographed image data to the other vacant area.

2. A digital camera according to claim 1, wherein the photographed image data is recorded over a plurality of clusters, and the mover including a data mover for moving the photographed image data for each cluster.

3. A digital camera according to claim 2, wherein said data mover is to move a predetermined cluster of the photographed image data following the maximum vacant area.

4. A digital camera controllable by a program and having an internal memory for recording photographed image data, comprising:

a receiver for receiving an additional program;

a first detector for detecting a first size of the additional program;

a second detector for detecting a second size of a maximum vacant area formed in said internal memory;

a third detector for detecting a total size of the vacant area formed in said internal memory;

an extender for extending the maximum vacant area when the first size is larger than the second size and equal to or smaller than the total size;

a writer for writing the additional program to the maximum vacant area extended by the extender; and a generator for generating a warning when the first size is larger than the total size.

* * * * *